Sept. 26, 1961 D. E. SCHEIRER 3,001,917
CONTINUOUS RAPID QUANTITATIVE DETERMINATION
OF HALOGENATED ORGANIC COMPOUND INHIBITOR
IN ETHYLENE OXIDE PLANT RECYCLE GAS
Filed Jan. 13, 1959 2 Sheets-Sheet 2
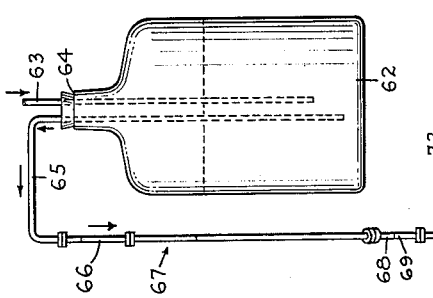
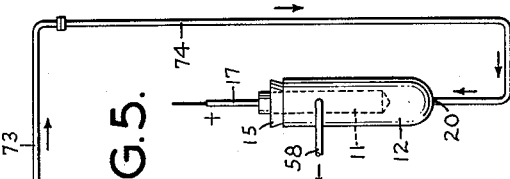
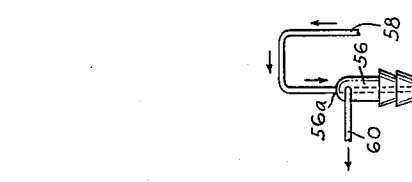
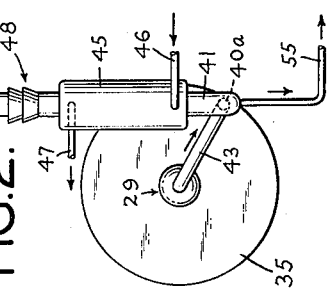
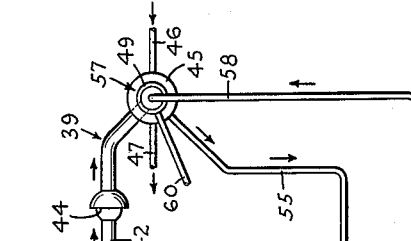
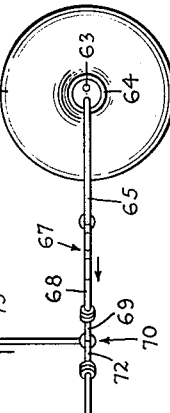
INVENTOR
DAVID E. SCHEIRER
BY
Roger J. Drew
ATTORNEY

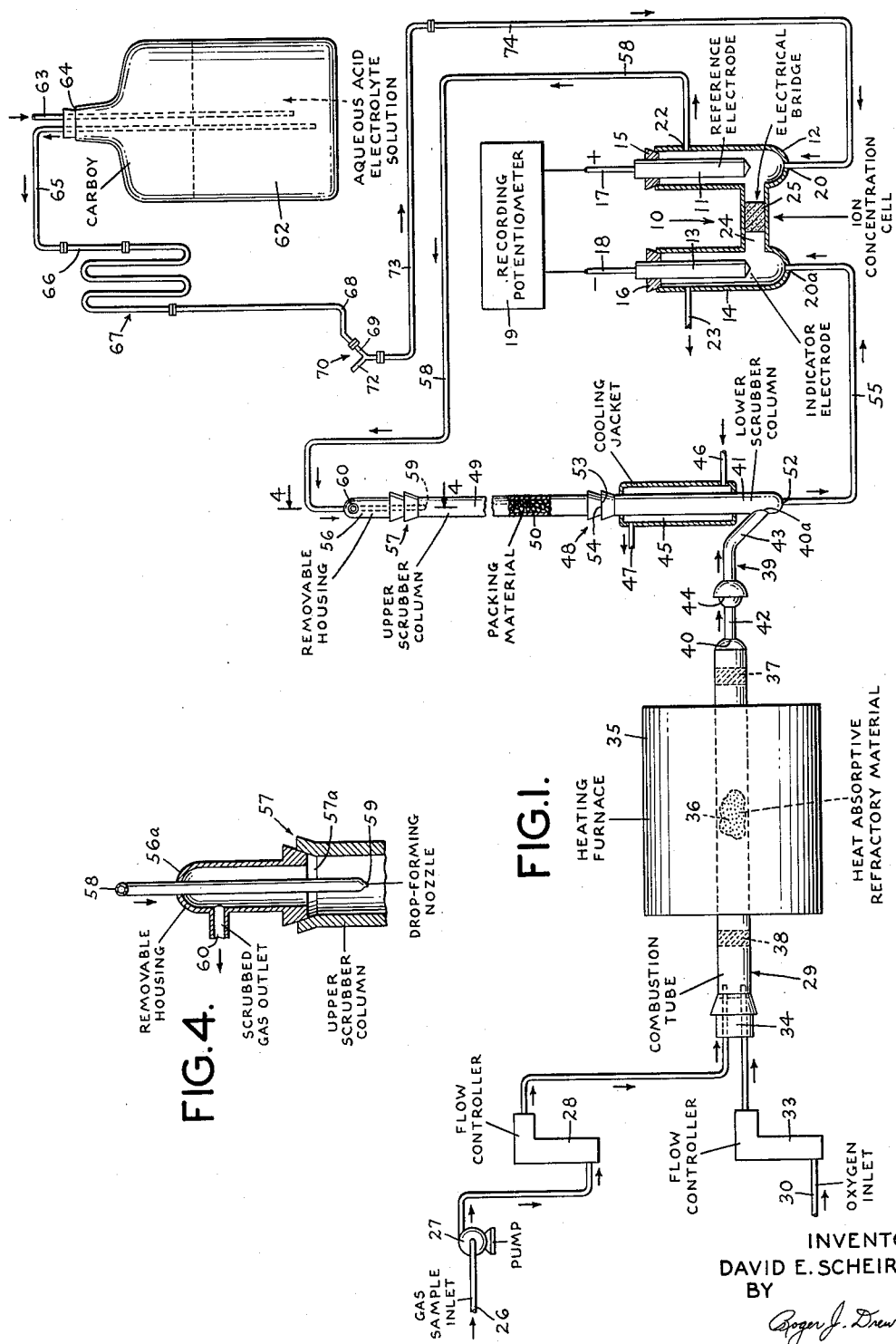

United States Patent Office

3,001,917
Patented Sept. 26, 1961

3,001,917
CONTINUOUS RAPID QUANTITATIVE DETERMINATION OF HALOGENATED ORGANIC COMPOUND INHIBITOR IN ETHYLENE OXIDE PLANT RECYCLE GAS
David E. Scheirer, Chester, Va., assignor to Allied Chemical Corporation, New York, N.Y., a corporation of New York
Filed Jan. 13, 1959, Ser. No. 786,645
7 Claims. (Cl. 204—1)

This invention relates to the continuous and rapid quantitative determination of the concentration of a halogenated organic compound present in a gaseous mixture. More particularly the invention is directed to a method and apparatus capable of continuously and rapidly quantitatively determining the low concentration of a halogenated compound inhibitor present in an ethylene oxide plant recycle gas.

Oxidation of ethylene to ethylene oxide is generally carried out by passing a mixture of ethylene and oxygen-containing gas, e.g. air, through tubes containing a supported silver catalyst maintained at temperature between about 200° and 350° C. Effluent gas comprising unreacted ethylene, carbon dioxide, nitrogen, oxygen, water vapor and ethylene oxide resulting from the catalytic oxidation is passed to a separating system, usually a scrubber column, where the ethylene oxide is absorbed or removed from the gases by scrubbing the same with water. Oxygen-containing gas, e.g. air, and ethylene are added as make-up to the remaining unabsorbed gases including unreacted ethylene, and the resulting gas mixture is recycled through the reactor.

Halogenated organic compound inhibitor has been added heretofore to the gas mixture containing ethylene and oxygen-containing gas entering the reactor or catalyst zone in small amount of less than 10 parts per million, preferably less than 1 part per million, to achieve or attain high yields of ethylene oxide by inhibiting undesirable formation of substantial quantities of by-products, primarily carbon dioxide and water, resulting from complete or total oxidation of ethylene. Examples of such halogenated organic compound inhibitors are ethylene dichloride, dichlorodiphenyltrichloroethane, hexabromobenzene, pentabromophenol, 1,2,2,2-tetrachloro-1,1-bis ethane, 9,10-dibromoanthracene, 3,4,5,6-tetrabrom-1,2-xylene, 2,3,5,6-tetrachlor-1,4-dichloromethylbenzene, 2,4,6 - tribrombenzophenone, 2,4' - dibrombenzophenone, chlorinated biphenyl, chlorinated polyphenyl compounds, chlorinated peroleum fractions such as heavy naphtha and kerosene, and mixtures thereof. A preferred inhibitor is a chlorinated polyphenyl compound boiling within a temperature range of from about 435° C. to 450° C. due to its desirable vapor pressure and stability, and because it is readily available.

It is essential that the amount of such halogenated organic inhibitor being added to the reactant gas mixture be maintained below 10 parts per million, inasmuch as any substantial increase above 10 parts per million causes poisoning of the catalyst with attendant reduced or lower ethylene oxide yields. Hence it is important that the concentration of halogenated organic compound inhibitor present in the reactant gas mixture be continuously determined, so that any changes required in the amount of make-up inhibitor being added to the reactant gas mixture to maintain the amount thereof within the aforesaid range can be made before the passing or expiration of a considerable time.

Analysis or quantitative determination of gaseous or gas mixtures for halogen-containing compounds has been accomplished in the past by chemical methods on individual samples taken periodically. Although the accuracy of these methods is adequate, the methods are time consuming and hence are unsatisfactory for use in connection with ethylene oxide plant operations. The primary reason for this is that the amount of halogenated organic inhibitor being added to the reactant gas mixture may increase to a concentration substantially above 10 parts per million during the considerable time required for carrying out the chemical analysis and expiring between samplings, with attendant poisioning of catalyst, decreased ethylene oxide yields, and shut-downs or disruption of operations to replace poisoned catalyst.

It is therefore an object of this invention to provide a method for continuously and rapidly quantitatively determining the concentration of a halogenated organic compound present in a gaseous mixture.

Another object is to provide a method for continuously and rapidly quantitatively determining the low concentration of a halogenated organic compound inhibitor present in an ethylene oxide plant recycle gas, thereby enabling close control of inhibitor concentration in the reactant gas mixture to maintain optimum performance of plant reactors.

Another object is to provide a method for continuously and rapidly quantitatively determining the low concentration of a halogenated organic compound inhibitor present in an ethylene oxide plant recycle gas which may also contain small amounts of sulfur compounds.

A further object is to provide an apparatus capable of continuously and rapidly quantitatively determining the low concentration of a halogenated organic compound inhibitor present in an ethylene oxide plant recycle gas, thereby enabling close control of inhibitor concentration in the reactant gas mixtures to maintain optimum performance of plant reactors.

Additional objects and advantages will be apparent as the invention is hereinafter described in detail.

The method of this invention comprises continuously passing a separate stream of a gaseous mixture sample containing a halogenated organic compound, e.g. an ethylene oxide plant recycle gas containing halogenated organic compound inhibitor as previously described, at a constant low rate of flow and continuously passing a separate stream of oxygen-containing gas, preferably oxygen, at a constant low rate of flow into admixture with one another, heating and burning the gaseous admixture to obtain hot gaseous combustion products including a hydrogen halide capable of readily ionizing in an aqueous electrolyte solution, and continuously passing the gaseous combustion products into a lower portion of a lower scrubber zone connected in series to an upper packed scrubbing zone. A liquid stream of aqueous electrolyte solution is continuously passed at a constant low rate of flow into one compartment of a two compartment ion-concentration cell, the compartment being provided with a reference electrode immersed in such electrolyte solution therein, and a liquid stream of aqueous electrolyte solution is continuously withdrawn from the reference electrode compartment at a point spaced from the point of its introduction therein and passed at a constant low flow rate approximately that at which the electrolyte is introduced into the reference electrode compartment into an upper portion of the aforementioned upper scrubbing zone. The hot gaseous combustion products pass upwardly within the lower and upper scrubbing zones in counterflow or intimate countercurrent contact with the liquid aqueous electrolye solution passing downwardly within the upper and lower scrubbing zones whereby the hydrogen halide is absorbed or dissolved in the electrolyte solution, the hot gaseous combustion products being concomitantly cooled in the lower scrubbing zone by indirect heat exchange with a cooling liquid. A liquid stream of aqueous electrolyte solution containing the hydrogen halide compound dissolved and ionized therein is continuously withdrawn from a lower portion of the lower scrubbing zone and passed into the other compartment of the concentration cell into exposure to an electrode therein, the last-mentioned electrode being made of material similar to that of the reference electrode, and the electrical potential difference between the two electrodes is measured. By knowing the flow rate of gaseous mixture sample being passed into or through the combustion zone or tube and the flow rate of aqueous electrolyte solution being passed into an upper portion of the upper scrubbing zone or column, the concentration of halogenated organic compound present in the gaseous mixture can be readily calculated or determined as is hereafter described.

It is essential for attainment of a high degree of accuracy in the quantitative determination of this invention that the hot combustion gases containing the hydrogen halide be cooled during the initial scrubbing or while in the lower scrubber column by indirect heat exchange with a cooling liquid, e.g. cold water. By virtue of such indirect cooling, the temperature of the gaseous combustion products passing through the scrubbing zones or columns can be readily controlled and can be kept sufficiently low to avoid evaporating considerable quantities of liquid aqueous scrubbing solution. Removal of virtually all of the hydrogen halide from the gas by the liquid scrubbing solution is thereby assured, and a high degree of accuracy in the quantitative determination can thereby be achieved. The terms "ethylene oxide plant recycle gas" and "recycle gas" are used in a broad sense herein to include the gas mixture resulting or flowing out from a plant wherein the catalytic oxidation of ethylene to ethylene oxide is carried out as previously described before or after product ethylene oxide has been separated therefrom and before or after make-up halogenated organic compound inhibitor is added thereto, and also to include the gas mixture resulting or flowing out from a once-through catalytic ethylene oxide plant wherein such effluent gas is not recycled to the reactor and before or after product ethylene oxide has been separated therefrom.

The apparatus of the invention comprises a two compartment ion-concentration cell having a reference electrode mounted in one compartment and an electrode mounted in the other compartment thereof, each electrode being made or fabricated of similar material, a separate inlet for aqueous electrolyte solution in the lower portion of each of said compartments, means for supplying an aqueous electrolyte solution at a constant low flow rate to the reference electrode compartment inlet, a separate outlet for aqueous electrolyte solution in each compartment spaced from the electrolyte solution inlet in each compartment, and means electrically connected to the electrodes for measuring the electrical potential difference therebetween. A tubular combustion vessel is provided with narrowly spaced inlets for gaseous mixture sample and oxygen-containing gas and an outlet for hot gaseous combustion products spaced from said inlets, and heating means are provided external the combustion vessel for supplying heat thereto. A flow controller is provided for regulating the rate of flow of the gaseous mixture sample to the combustion vessel inlet therefor. Another flow controller is provided for regulating the rate of flow of oxygen-containing gas, e.g. pure oxygen to its combustion vessel inlet. An upper and a lower scrubber or absorber column are connected in series, each column having a lower gas inlet and an upper gas outlet, the upper column being provided with packing material and the lower column being jacketed or provided with a cooling jacket. A first enclosed passageway leads from the combustion vessel outlet to the lower gas inlet of the jacketed column; a second enclosed passageway leads from the aqueous electrolyte solution outlet of the reference electrode compartment to the upper portion of the upper scrubber column; and a third enclosed passageway leads from an outlet for aqueous electrolyte solution in the lower portion of the lower column to the aqueous electrolyte solution inlet of the other electrode compartment.

A constant head siphon device or arrangement hereinafter described preferably constitutes the means for supplying aqueous electrolyte solution at a constant low flow rate to the solution inlet of the reference electrode compartment. Such siphon device is characterized by not having corrodible moving parts and, hence, can supply the electrolyte solution, e.g. aqueous sulfuric acid solution, without being prematurely worn out or eaten away by acid corrosion. On the contrary, pumps typically have moving parts made of corrodible material and the acid of the electrolyte solution tends to corrode and eat away the parts resulting in premature wearing out of the pump with attendant replacement costs.

In the drawings:

FIG. 1 is a side elevational view partly in section of one form of the apparatus of this invention.

FIG. 2 is an elevational view taken along line 2—2 of FIG. 1 showing the upper and lower serially connected scrubber columns of the invention, the lower column being provided with a cooling jacket.

FIG. 3 is a top plan view of the apparatus of FIG. 1.

FIG. 4 is an enlarged detail view partly in section taken along line 4—4 of FIG. 1 showing the aqueous acid electrolyte solution conduit nozzle or drip tip in the upper portion of the upper scrubber column, and the cylindrical or tubular housing having a scrubbed gas outlet and removably inserted in the upper portion of the upper scrubber column.

FIG. 5 is an end elevational view looking from the right side of the apparatus of FIG. 1.

Referring now to FIGS. 1–5 of the drawings showing one embodiment of the apparatus of this invention, two compartment ion-concentration cell 10 of glass has reference electrode 11 mounted in cylindrical compartment 12 thereof and indicator or sensing electrode 13 mounted in cylindrical compartment 14 thereof. The electrodes are made or fabricated in known manner of similar material, preferably silver, although silver-silver chloride, silver-silver bromide or silver-silver iodide electrodes could be utilized, if desired. Silver electrodes provide sensitivity only to those ions which form insoluble silver salts such as the halogen ions, and remain insensitive to most other ions, and hence provide a high degree of specificity and sensitivity not attainable by many other electrodes. As shown, the electrodes are mounted in compartments 12 and 14 by means of single orifice rubber stoppers 15 and 16, and have stainless steel rods 17 and 18 projecting upwardly therefrom serving as electrical binding posts. Conventional potentiometer 19 is electrically connected to electrode binding posts 17 and 18 by electrical conductor wires.

Inlets 20 and 20a for aqueous electrolyte solution are provided in the lower portion of each cell compartment and outlets 22 and 23 for electrolyte solution are provided in the upper portion of each compartment. As shown, inlet 20a is preferably so disposed in the lower portion of compartment 14 that aqueous electrolyte solution containing halogenated inorganic compound dissociated or ionized therein, such as hydrogen chloride, directly impinges on an active surface of electrode 13. Such arrangement of inlet 20a provides a more highly sensitive and responsive apparatus or instrument, and permits very rapid measurements to be made. Duct 24, adapted to contain aqueous electrolyte solution, connects cell compartments 12 and 14, preferably at a lower portion of each compartment, and serves as an electrical bridge (for flow of electricity). Duct 24 has liquid-pervious solid media or material 25 therein, e.g. finely divided silica passing substantially a 200 mesh sieve, although other liquid-pervious solid material such as finely divided "Celite" or fire brick of similar mesh size could be used, if desired. Electrolyte solution penetrates slowly through pervious solid media 25 by capillary action. Concentration cell 10 and the upper and lower scrubber columns hereafter described may be advantageously mounted within a thermostatically controlled constant temperature cabinet or container (not shown) having a temperature therein of, for example, 130° F. (±0.5° F.).

Conduit 26 of glass provided with conventional pump and flow controller 27 and 28 respectively for supply of gaseous mixture sample leads from a source or supply of gaseous sample (not shown) to an inlet of a combustion tube indicated generally at 29. Glass conduit 30 also provided with a conventional flow controller 33 for supplying free oxygen-containing gas, e.g. oxygen, from a tank or cylinder (not shown) containing the gas under pressure leads from the tank to another inlet of combustion tube 29 adjacent last-mentioned inlet. As shown, conduits 26 and 30 extend a small or limited distance into one end of combustion tube 29 through two hole rubber stopper 34 in the tube end. Horizontal combustion tube 29 of quartz of substantial or considerable length is mounted or partially enclosed within heating furnace 35 having walls of refractory insulating material such as silica brick, e.g. an electrical heating furnace provided with a plurality of spaced metallic bars heated by resistance to passage of electric current therethrough, although a gas fired furnace, such as one fired with coke oven gas could be used, if desired. Combustion tube 29 is preferably packed with a gas-pervious mass of heat absorptive refractory material 36, e.g. finely divided silica gel of 5–10 mesh. If desired, finely divided "Celite" or fire brick of similar mesh size could be used in place of silica gel. As shown, refractory material 36 is retained in tube 29 by means of gas-pervious plugs 37 and 38 of glass wool. An enclosed passageway indicated generally at 39 leads from combustion tube outlet 40 for hot gaseous combustion products to the lower gas inlet 40a of lower scrubber column 41, such passageway being formed by integral conduit extension 42 of quartz joined to partially inclined glass conduit 43 through ball and socket joint 44.

Lower scrubber column 41 of glass is provided with cooling jacket 45 of glass having cooling liquid inlet 46 and outlet 47. Examples of suitable cooling liquids utilizable are cold water, brine, alcohol or acetone. While lower column 41 is preferably unpacked or unobstructed, it may be packed with packing material hereafter mentioned, if desired. Lower column 41 is serially connected through ground joint indicated generally at 48 to glass upper scrubber column 49 provided with packing material 50 of glass beads to provide more intimate contact between gas and scrubbing liquid, although silica pieces or other packing material well known in the art could be utilized in the upper column, if desired. Outlet 52 for liquid aqueous electrolyte solution containing dissolved and ionized halogenated inorganic compound is provided in the lower or bottom portion of lower column 41 below gas inlet 40a, and gas outlet 53 is provided in the upper portion of column 41. Upper column 49 has lower gas inlet 54 and upper gas outlet 60 hereafter described. Conduit 55 of glass leads from lower outlet 52 of lower scrubber column 41 to inlet 20a of cell compartment 14.

Tubular or cylindrical housing 56 of glass having a closed top portion 56a and an open bottom portion 57a is removably inserted in the open top portion of upper column 49 by means of ground joint indicated generally at 57. As shown in greater detail in FIG. 4, glass conduit 58 leading from upper outlet 22 of cell compartment 12 intersects closed top portion 56a of housing 56 and extends axially downwardly therein and terminates as a drip-tip or nozzle 59 for formation of liquid electrolyte solution drops within an upper portion of upper scrubber column 49. Scrubbed gas outlet 60 is provided in the upper portion of housing 56. Removable housing 56 is advantageous because it facilitates addition and removal of packing material from the column and cleaning of the column.

Carboy or container 62 of glass for liquid aqueous electrolyte solution is located a substantial or considerable distance above a top level of ion concentration cell 10. Glass conduit 63, which is open at its top to the atmosphere to allow air to pass into container 62, extends downwardly through one hole of 2-hole rubber stopper 64 and within container 62 and terminates beneath the surface of liquid aqueous electrolyte solution therein at a level above the termination of conduit 65. Conduit 65 of glass extends downwardly through the other hole of stopper 64 and within container 62 and terminates beneath the surface of the liquid electrolyte solution. As air bubbles into container 62 through conduit 63, approximately atmospheric pressure exists at the bottom of conduit 63, such pressure remaining at atmospheric even though the liquid level in container 62 changes. Container 62 is periodically refilled with the liquid electrolyte solution. As shown, glass looped conduit indicated generally at 67, which is a capillary tube about 4–8 feet long acting as a flow control is connected to conduit 65 through flexible conduit 66 of inert material such as "Tygon" or polyethylene. Flexible conduit 68 of aforesaid inert material connects opposite end of looped conduit 67 with arm 69 of glass Y-tube indicated generally at 70. The liquid electrolyte solution is delivered at a constant rate to Y-tube 70, this Y-tube acting as a funnel to receive the liquid and communicating with atmosphere through open arm 72. The outer open end of arm 72 may be loosely closed with gas-pervious glass wool. Y-tube 70 is located at an elevation above drip-tip 59 to enable forcing liquid electrolyte solution through the reference electrode compartment, through the overflow outlet of such compartment and thence to the upper scrubber column. Y-tube 70 is connected through flexible conduit 73 of aforesaid inert material to glass conduit 74, which in turn leads to electrolyte solution inlet 20 of cell compartment 12. Flexible conduits 66, 68 and 73 should not be made of rubber or other materials which might contaminate the electrolyte solution.

With respect to the method, a sample of ethylene oxide plant recycle gas containing nitrogen, oxygen, ethylene, carbon dioxide, a small or low concentration of a halogenated inorganic compound inhibitor, e.g. a chlorinated polyphenyl compound boiling within a temperature range of from about 435° C. to 450° C. and which may contain some ethylene oxide is continuously passed or pumped through conduit 26 provided with flow controller 28 by means of pump 27 such as a solenoid pump, at a measured and constant low flow rate of preferably from about 0.02 to 20 liters per minute into combustion tube 29. Oxygen gas is continuously passed through conduit 30 provided with flow controller 33 from a cylinder or tank containing the same under pressure at a measured and constant low flow rate of preferably from about 0.01 to 10 liters per minute into combustion tube 29 into admixture with the ethylene oxide plant recycle gas sample. Oxygen is preferred but atmospheric air or oxygen-enriched atmospheric air could be used, if desired. If oxygen-enriched or unmodified atmospheric air is used, the air should be withdrawn from the atmosphere in a region remote from industrial plants and devices tending to contaminate the atmosphere with foreign materials and gases. The flow rates of oxygen-containing gas and effluent gas sample being passed into admixture in tube 29 are preferably adjusted or regulated within the aforementioned flow rate ranges to provide an amount of oxygen in the admixture within combustion tube 29 in excess of that amount theoretically required to oxidize all organic material in the admixture including the halogenated organic compound inhibitor and any sulfur compounds therein as hereafter described, but exclusive of the carbon dioxide constituent of the recycle gas sample, to obtain carbon dioxide, water and sulfur dioxide. The gas mixture of ethylene oxide plant recycle and oxygen-containing gas passes continuously through the gas-pervious mass of heat-absorptive refractory material provided within the heated zone of the tube, and is heated and burned therein at a temperature typically of about 700° C.–1100° C. to obtain gaseous combustion products including the carbon dioxide, water vapor, sulfur dioxide when the sulfur compounds are present in the gas mixture, oxygen, nitrogen and a hydrogen halide capable of readily ionizing in an aqueous electrolyte solution.

The recycle gas sample passed into combustion tube 29 may contain small amounts of sulfur compounds such as methyl or ethyl mercaptan in addition to the halogenated organic compound inhibitor for the reason that the commercial ethylene used for the ethylene oxide production often contains small amounts of sulfur compounds. Such sulfur compounds are oxidized to render the same harmless in the system to oxygen compounds of sulfur such as sulfur dioxide, and such oxidation of the sulfur compounds is effected by the oxygen-containing gas of this invention. However, use of hydrogen gas of prior art quantitative determinations in the determination of this invention would result in formation of reduced sulfur which would attack the silver electrodes of the concentration cell.

Hot gaseous products of combustion pass from combustion tube 29 at susbtantially constant flow rate through gas-pervious plug 37 and through enclosed passageway 39 formed by conduits 42 and 43 to inlet 40a of lower scrubber column 41 provided with cooling jacket 45. The hot gaseous products pass serially upwardly within jacketed column 41 and then within upper packed column 49 in intimate countercurrent contact with liquid electrolyte solution introduced at the upper portion of upper column 49 and flowing serially downwardly within this column and then within jacketed column 41, whereby a hydrogen halide such as hydrogen chloride is absorbed or dissolved in the electrolyte solution. Liquid electrolyte solution containing the absorbed or dissolved hydrogen halide is withdrawn from jacketed column 41 through outlet 52 and passed to cell compartment 14 of concentration cell 10 through enclosed passageway or conduit 55. Scrubbed gas comprising carbon dioxide, water vapor, nitrogen and oxygen passes from upper column 49 and is withdrawn through gas outlet 60 of removable housing 56.

The hot gaseous combustion products after withdrawal from combustion tube 29 and prior to introduction into lower jacketed scrubber column 41 are at a temperature typically of about 100° C.–300° C. The hot gases are cooled within lower column 41 while concomitantly being scrubbed therein to a temperature of about 10° C.–40° C. by indirect transfer of heat from the hot gaseous products to a cooling liquid, e.g. cold water, introduced at inlet 46 and circulating in the annular space between or defined by jacket 45 and column 41 and withdrawn at outlet 47. Such cooling by indirect heat exchange is essential for obtainment of a high degree of accuracy in the quantitative determination of the halogenated organic compound concentration as previously discussed.

Liquid aqueous electrolyte solution, e.g. aqueous sulfuric acid solution and preferably aqueous sulfuric acid solution saturated with a silver halide, the halogen of which corresponds to the halogen of the halogenated organic compound inhibitor, is continuously passed at a constant low flow rate, preferably of from about 0.0005 to 0.02 liter per minute, by gravity flow through conduit 65, flexible conduit 66, looped conduit 67, flexible conduit 68, Y-tube arm 69, flexible conduit 73 and conduit 74 to inlet 20 of reference electrode cell compartment 12. Silver halide is present in preferred electrolyte solution to provide a low constant concentration of halide at the reference electrode, and to serve as a stabilizer for the reference and indicator electrodes. Aqueous nitric or phosphoric acid solutions can be used for the electrolyte solution instead of the aqueous sulfuric acid. Less preferably, salt solutions such as aqueous solutions of sulfates, nitrates and phosphates can also be used as the electrolyte solutions. The flow rate of electrolyte solution to cell compartment 12 and through the remaining apparatus can be determined by measuring the time required for a given or known quantity of electrolyte solution to discharge from outlet 23 of cell compartment 14. Such electrolyte solution flows or passes from elevated carboy or container 62 to inlet 20 of cell compartment 12 under a constant hydrostatic head to continuously displace electrolyte solution from compartment 12 as overflow through overflow outlet 22 wherefrom the electrolyte solution is forced or passes via conduit 58 to drip tip or nozzle 59 in the upper portion of upper scrubber column 49. Drops of liquid aqueous acid electrolyte solution pass downwardly from nozzle 59 and trickle or pass downwardly over packing in column 49 in intimate countercurrent contact with uprising gases as previously described.

Aqueous electrolyte solution containing absorbed or dissolved hydrogen halide passes or flows into cell compartment 14 through lower inlet 20a as previously stated into direct impingement with an active surface of the electrode therein, and electrolyte solution is withdrawn as overflow from an upper portion of compartment 14 through outlet 23. Difference in electrical potential between electrodes 13 and 11, the value of which is a function of the amount or concentration of halide in the electrolyte solution in compartment 14, is continuously measured by potentiometer 19, preferably a recording potentiometer with a span of 0–50 mv. or 0–100 mv. By controlling the rates of flow of gaseous mixture sample or ethylene oxide plant effluent gas sample into or through the combustion zone or tube and liquid aqueous electrolyte solution into the upper scrubber column at definite and known values, and by employing a calibrated ion concentration cell, the halogen or chloride equivalent of the gas sample can be related to the chloride found in the aqueous electrolyte solution withdrawn from lower outlet 52 of the lower scrubber column by the following equation:

P.p.m. chloride equivalent in sample gas (STP)

$$= \frac{\text{p.p.m. Cl found} \times 0.631 \times \text{liters/minute aqueous electrolyte solution flow into upper scrubber column}}{\text{liters/minute gas sample flow through combustion tube}}$$

Prior to calibrating concentration cell 10 and to making analyses or determinations, all scrubber or electrolyte solution conduits, the upper and lower scrubber columns, and the cell compartments were thoroughly cleaned. A zero check was then made by running 0.4 molar sulfuric acid aqueous solution saturated with silver chloride through the system to flush all parts and its flow rate was adjusted to about 1 ml. (i.e. about .001 liter) per minute. The 0.4 molar sulfuric acid aqueous solution was prepared by diluting 356 ml. concentrated sulfuric acid, 50 ml. of 0.020 molar silver nitrate and 50 ml. of 0.020 molar sodium chloride to 16 liters with chloride free (<0.05 p.p.m.) distilled water. Oxygen was then passed through the combustion tube and thence to the scrubber columns at 0.1 liter per minute, and the electrical potential difference between the electrodes was recorded on a recording potentiometer for a 4 hour period. The electrical potential difference was found to be less than 1 millivolt off zero.

Concentration cell 10 was then calibrated by use of solutions of sodium chloride of known concentrations. In effecting such calibration, a solution of approximately 1000 p.p.m. chloride was made up by dissolving 1.65 grams of sodium chloride in 1 liter of distilled water. Aliquot portions of such sodium chloride solution of 0.5, 1.0 and 1.5 ml. were then each diluted to 500 ml. with the previously described 0.4 molar sulfuric acid aqueous solution to give solutions containing 1, 2 and 3 p.p.m. chloride. Approximately 200 ml. of one sodium chloride solution was then poured slowly into the upper scrubber column and passed thence to the lower scrubber column and to the indicator or sensing electrode compartment of the concentration cell. The cell reference electrode compartment contained the 0.4 molar sulfuric acid aqueous solution previously described. Electrical equilibrium was established for 30 minutes and a millivolt reading then taken on the potentiometer. Such procedure was then repeated utilizing the remaining two standard sodium chloride solutions. The solution containing 1 p.p.m. chloride ion gave a reading of 6 millivolts on the potentiometer; the solution containing 2 p.p.m. chloride gave a reading of 16.5 millivolts; and that containing 3 p.p.m. chloride a reading of 24.5 millivolts.

In making typical determination in the apparatus previously described, a sample of ethylene oxide plant recycle gas was continuously passed at the rate of 0.319 liter/minute together with oxygen at 0.6 liter/minute (as determined by rotameters) through the tubular combustion vessel heated at temperature of 867° C. Flow of the aforementioned 0.4 molar sulfuric acid aqueous solution saturated with silver chloride through the apparatus was regulated at 1.14 ml./minute (i.e. about .001 liter per minute). The potentiometer showed a reading of 15.0 millivolts for the potential difference between the indicating and reference electrodes. This electrical potential difference corresponded to a 1.86 p.p.m. chloride increase in the scrubber solution. By substituting in the equation previously set forth for determining halogen or chloride concentration in the sample gas, it was found that the sample gas contained 4.2 p.p.m. chloride equivalent. By standard chemical analytical procedure, a spot sample of ethylene oxide recycle gas was found to contain 4.2 p.p.m. chloride equivalent.

Although certain preferred embodiments of the invention have been disclosed for purpose of illustration, it will be evident that various changes and modifications may be made therein without departing from the scope and spirit of the invention.

What is claimed is:

1. A method for continuously and rapidly quantitatively determining the concentration of a halogenated organic compound present in a gaseous mixture, which comprises continuously passing a separate stream of a sample of said gaseous mixture containing the halogenated organic compound at a constant low rate of flow and continuously passing a separate stream of oxygen-containing gas at a constant low rate of flow into admixture with one another, heating and burning the gaseous admixture of said oxygen-containing gas and said gaseous sample to obtain hot gaseous combustion products including a hydrogen halide capable of readily ionizing in a liquid aqueous electrolyte solution, continuously passing said hot gaseous combustion products into a lower portion of a lower scrubbing zone connected in series with an upper packed scrubbing zone, continuously passing a liquid stream of an aqueous electrolyte solution at a constant low rate of flow into one compartment of a two compartment ion-concentration cell, said compartment having a silver-containing reference electrode immersed in said electrolyte solution, continuously withdrawing a liquid stream of said electrolyte solution from said reference electrode compartment at a point spaced from the point of introducing said electrolyte solution therein and passing said electrolyte solution at a constant low flow rate approximately that at which the electrolyte solution is introduced into said reference electrode compartment into an upper portion of said upper scrubbing zone, passing said hot gaseous combustion products including the hydrogen halide upwardly within said lower and upper scrubbing zones in intimate countercurrent contact with said liquid aqueous electrolyte solution passing downwardly within said upper and lower scrubbing zones to dissolve said hydrogen halide in said aqueous electrolyte solution, the hot gaseous combustion products being concomitantly cooled in said lower scrubbing zone by indirect heat exchange with a cooling liquid, continuously withdrawing a liquid stream of said aqueous electrolyte solution containing the hydrogen halide dissolved and ionized therein from a lower portion of the lower scrubbing zone and passing the same into the other compartment of said concentration cell into exposure to a silver-containing electrode therein, and measuring the electrical potential difference between the two electrodes.

2. A method for continuously and rapidly quantitatively determining the low concentration of a halogenated organic compound inhibitor present in an ethylene oxide plant recycle gas, which comprises continuously passing a separate stream of a sample of said ethylene oxide plant recycle gas containing the halogenated organic compound at a constant low rate of flow and continuously passing a separate stream of oxygen-containing gas at a constant low rate of flow into admixture with one another, heating and burning the gaseous admixture of said oxygen-containing gas and said gas sample to obtain hot gaseous combustion products including a hydrogen halide capable of readily ionizing in a liquid aqueous acid electrolyte solution, continuously passing said hot gaseous combustion products into a lower portion of a lower scrubbing zone connected in series with an upper scrubbing zone, continuously passing a liquid stream of an aqueous acid electrolyte solution at a constant low rate of flow into one compartment of a two compartment ion-concentration cell, said compartment having a silver-containing reference electrode immersed in said acid electrolyte solution, continuously withdrawing a liquid stream of said electrolyte solution from said reference electrode compartment at a point spaced from the point of introducing said electrolyte therein and passing said electrolyte solution at a constant low flow rate approximately that at which the electrolyte solution is introduced into said reference electrode compartment into an upper portion of said upper scrubbing zone, passing said hot gaseous combustion products including the hydrogen halide upwardly within said lower and upper scrubbing zones in intimate countercurrent contact with said liquid aqueous electrolyte solution passing downwardly within said upper and lower scrubbing zones to dissolve said hydrogen halide in said aqueous electrolyte solution, the hot gaseous combustion products being concomitantly cooled in said lower scrubbing zone by indirect heat exchange with a cooling liquid, continuously withdrawing a liquid stream of said aqueous electrolyte solution containing the hydrogen halide dissolved and ionized therein from a lower portion of the lower scrubbing zone below the point of introducing gaseous combustion products therein and passing the same into the other compartment of said concentration cell into exposure to a silver-containing electrode therein, and continuously measuring the electrical potential difference between the two electrodes.

3. A method for continuously and rapidly quantitatively determining the low concentration of a halogenated organic compound inhibitor present in an ethylene oxide plant recycle gas containing nitrogen, oxygen, ethylene, carbon dioxide and perhaps sulfur compounds which comprises continuously passing a separate stream of a sample of said recycle gas containing the halogenated organic compound at a constant low flow rate of from about 0.02 to 20 liters per minute and continuously passing a separate stream of oxygen gas at a constant low flow rate of from about 0.01 to 10 liters per minute into admixture with one another, regulating the flow rates of said gas sample and said oxygen gas into said admixture within the aforesaid flow rate ranges to provide an amount of oxygen in said admixture in excess of that amount theoretically required to oxidize the organic material therein exclusive of the carbon dioxide and also any sulfur compounds therein to carbon dioxide, water and sulfur dioxide, heating and burning the gaseous mixture of oxygen and said gas sample in said combustion zone to obtain gaseous combustion products including the carbon dioxide, water, sulfur dioxide when the sulfur compounds are present in said gaseous admixture and a hydrogen halide capable of readily ionizing in a liquid aqueous sulfuric acid solution saturated with a silver halide, continuously passing the gaseous combustion products having temperature of about 100° C.–300° C. into a lower portion of a lower unpacked scrubbing zone connected in series with an upper packed scrubbing zone, continuously passing a liquid stream of an aqueous sulfuric acid solution saturated with a silver halide, the halogen of which corresponds to the halogen of the halogenated organic compound inhibitor, at a constant low flow rate of from about 0.0005 to 0.02 liter per minute into a lower portion of one compartment of a two compartment ion-concentration cell, said cell compartment having a silver reference electrode partially immersed in the aqueous sulfuric acid solution, continuously withdrawing a liquid stream of said aqueous sulfuric acid solution saturated with the silver halide from an upper portion of said cell compartment and passing the aqueous sulfuric acid solution at a constant low flow rate approximately that at which the aqueous acid solution is introduced into said reference electrode compartment into an upper portion of said upper scrubbing zone, passing the hot gaseous combustion products including the hydrogen halide upwardly within said lower and upper scrubbing zones in intimate countercurrent contact with said liquid aqueous sulfuric acid solution saturated with the silver halide passing gravitationally downwardly within said upper and lower scrubbing zones to dissolve said hydrogen halide in said aqueous sulfuric acid solution, the hot gaseous combustion products being concomitantly cooled in said lower scrubbing zone to a temperature of about 10° C.–40° C. by indirect heat exchange with a cooling liquid, continuously withdrawing a liquid stream of said aqueous sulfuric acid solution containing the hydrogen halide dissolved and ionized therein from a lower portion of the lower scrubbing zone below the point of introducing gaseous combustion products therein and passing the same into a lower portion of the other compartment of said concentration cell into direct impingement with an active surface of a silver electrode therein, continuously withdrawing the aqueous sulfuric acid solution as overflow from an upper portion of the last-mentioned cell compartment, and continuously measuring the electrical potential difference between the two silver electrodes.

4. Apparatus for continuously and rapidly quantitatively determining the concentration of a halogenated organic compound present in a gaseous mixture comprising two compartment ion-concentration cell having a silver-containing reference electrode mounted in one compartment thereof and a silver-containing electrode mounted in the other compartment thereof, an inlet for a liquid aqueous electrolyte solution in each of said compartments, means for supplying a liquid aqueous electrolyte solution at a constant low flow rate to the reference electrode compartment inlet, a separate outlet for liquid aqueous electrolyte solution in each of said compartments spaced from the electrolyte solution inlet in each compartment, electrical means connected to said electrodes for measuring electrical potential difference therebetween, a tubular combustion vessel provided with narrowly spaced inlets for gaseous mixture sample and oxygen-containing gas and an outlet for hot gaseous combustion products spaced from said inlets, heating means external said vessel for supplying heat thereto, a flow controller for regulating the rate of flow of the gaseous mixture to the combustion vessel inlet therefor, another flow controller for regulating the rate of flow of oxygen-containing gas to the combustion vessel inlet therefor, an upper packed scrubber column connected in series with a lower scrubber column, each of said columns having a lower gas inlet and an upper gas outlet, an outlet for discharge of liquid aqueous electrolyte solution containing a hydrogen halide ionized therein from the lower portion of the lower column, a cooling jacket surrounding the lower column, a first enclosed passageway leading from said gaseous combustion product outlet of the combustion vessel to the lower gas inlet of the lower jacketed column whereby the gaseous combustion products flow upwardly within the lower and upper columns from said lower gas inlet to said upper gas outlet of each column, a second enclosed passageway leading from the liquid electrolyte solution outlet of the reference electrode compartment to an upper portion of said upper column whereby liquid aqueous electrolyte solution flows downwardly within said upper and lower columns in intimate countercurrent contact with the upflowing gaseous combustion products, and a third enclosed passageway leading from said electrolyte solution outlet of the lower column to said electrolyte solution inlet of said other cell compartment.

5. Apparatus for continuously and rapidly quantitatively determining the low concentration of a halogenated organic compound inhibitor present in an ethylene oxide plant recycle gas comprising a two compartment ion-concentration cell having a silver-containing reference electrode mounted in one compartment thereof and a silver-containing electrode mounted in the other compartment thereof, an inlet for liquid aqueous electrolyte solution in the lower portion of each of said compartments, means for supplying a liquid aqueous electrolyte solution at a constant low flow rate to the reference electrode compartment inlet, a separate outlet for liquid aqueous electrolyte solution in an upper portion of each of said compartments, electrical means connected to said electrodes for measuring electrical potential difference therebetween, a horizontal tubular combustion vessel containing a gas-pervious mass of heat-absorptive refractory material therein, said combustion vessel being provided at one end thereof with narrowly spaced inlets for recycle gas sample and for oxygen-containing gas and an outlet for hot gaseous combustion products at the opposite end thereof, heating means external said vessel for supplying heat thereto, a flow controller for regulating the rate of flow of a sample of said recycle gas to the combustion vessel inlet therefor, another flow controller for regulating the rate of flow of oxygen-containing gas to the combustion vessel inlet therefor, an upper packed scrubber column connected in series with a lower scrubber column, each of said columns having a lower gas inlet and an upper gas outlet, an outlet for discharge of liquid aqueous electrolyte solution containing a hydrogen halide ionized therein in the lower portion of the lower column below its gas inlet, a cooling jacket surrounding the lower column, a first enclosed passageway leading from said gaseous combustion product outlet of the combustion vessel to the lower gas inlet of the lower jacketed scrubber column whereby the gaseous combustion products flow upwardly within the lower and upper columns from said lower gas inlet to said upper gas outlet of each column, a second enclosed passageway leading from the liquid electrolyte solution outlet of the reference electrode compartment to an upper portion of said upper scrubber column whereby liquid aqueous electrolyte soltion flows gravitationally downwardly within said upper column and said lower column in intimate countercurrent contact with the upflowing gaseous combustion products, and a third enclosed passageway leading from said electrolyte solution outlet of the lower column to said electrolyte solution inlet of said other cell compartment.

6. Apparatus for continuously and rapidly quantitatively determining the low concentration of a chlorinated organic compound inhibitor present in an ethylene oxide plant recycle gas comprising a two compartment ion-concentration cell having a silver reference electrode mounted in one compartment thereof and a silver electrode mounted in the other compartment thereof, an inlet for liquid aqueous sulfuric acid solution containing a hydrogen halide dissolved and ionized therein so disposed in the lower portion of said other compartment that said hydrogen halide-containing sulfuric acid solution directly impinges on an active surface of the electrode therein, an inlet for liquid aqueous sulfuric acid solution saturated with silver chloride in the lower portion of the reference electrode compartment, a container for said aqueous sulfuric acid solution saturated with silver chloride disposed at an elevation above said concentration cell to provide a constant hydrostatic head, conduit means interconnecting the elevated container and said liquid aqueous acid solution inlet of the reference electrode compartment for supplying said liquid acid solution to the last-mentioned inlet at a constant low flow rate under a constant head, an overflow outlet for the liquid aqueous sulfuric acid solution in the upper portion of each of said compartments, a potentiometer electrically connected to said electrodes, a horizontal tubular combustion vessel containing a gas-pervious mass of heat-absorptive refractory material therein, said combustion vessel being provided at one end thereof with narrowly spaced inlets for recycle gas sample and for oxygen-containing gas and an outlet for hot gaseous combustion products at the opposite end thereof, a heating furnace surrounding a major portion of said combustion vessel for supplying heat thereto, a flow controller for regulating the rate of flow of a sample of said recycle gas to the combustion vessel inlet therefor, another flow controller for regulating the rate of flow of oxygen-containing gas to the combustion vessel inlet therefor, an upper packed scrubber column and a lower unpacked rubber column connected in series, each of said columns having a lower gas inlet and an upper gas outlet, an outlet for discharge of liquid aqueous sulfuric acid solution containing hydrogen chloride ionized therein from the lower portion of the lower column below the gas inlet, a cooling jacket surrounding the lower column, an enclosed passageway leading from said gaseous combustion product outlet of the combustion vessel to the lower gas inlet of the lower jacketed scrubber column whereby the gaseous combustion products flow upwardly within the lower and upper columns from said lower gas inlet to said upper gas outlet of each column, a first conduit leading from the liquid aqueous acid solution overflow outlet of the reference electrode compartment to an upper portion of said upper scrubber column whereby liquid aqueous sulfuric acid solution saturated with silver chloride flows gravitationally downwardly within said upper column and said lower column in intimate countercurrent contact with the upflowing gaseous combustion products, and a second conduit leading from said liquid aqueous sulfuric acid solution outlet of the lower column to said liquid aqueous acid solution inlet of said other cell compartment.

7. The apparatus of claim 6 further characterized by having a cylindrical housing having a closed top portion and an open bottom portion removably inserted in an open top portion of the upper scrubber column forming the gas outlet thereof, the aforesaid first conduit leading from the liquid aqueous acid solution overflow outlet of the reference electrode compartment intersecting said top portion of the housing and extending axially downwardly therein and terminating as a liquid drop-forming nozzle within an upper portion of said upper column, said housing having a scrubbed gas outlet in an upper portion of a side wall thereof.

References Cited in the file of this patent
UNITED STATES PATENTS

| | | |
|---|---|---|
| 1,430,785 | Blanchard | Oct. 3, 1922 |
| 2,230,593 | Hassler | Feb. 4, 1941 |
| 2,278,248 | Darrah | Mar. 31, 1942 |
| 2,370,871 | Marks | Mar. 6, 1945 |
| 2,382,734 | Marks | Aug. 14, 1945 |
| 2,396,934 | Wallace | Mar. 19, 1946 |
| 2,593,878 | Haines et al. | Apr. 22, 1952 |
| 2,758,079 | Eckfeldt | Aug. 7, 1956 |